United States Patent [19]
Hinohara

[11] Patent Number: 5,982,141
[45] Date of Patent: Nov. 9, 1999

[54] BATTERY CHARGING IN UNITS HAVING ATTACHABLE EXPANSION DEVICES, AND IN SUCH EXPANSION DEVICES

[75] Inventor: Makoto Hinohara, Tokyo, Japan

[73] Assignee: Canon Kabushiki Kaisha, Tokyo, Japan

[21] Appl. No.: 08/901,137

[22] Filed: Jul. 28, 1997

[30] Foreign Application Priority Data

Sep. 10, 1996 [JP] Japan .................................. 8-239097

[51] Int. Cl.$^6$ ......................... H01M 10/46; H01M 10/44
[52] U.S. Cl. .......................................................... 320/113
[58] Field of Search .................................. 320/106, 112, 320/113, 115, 116, 119, 123, FOR 101, FOR 104, FOR 114

[56] References Cited

U.S. PATENT DOCUMENTS

| | | | |
|---|---|---|---|
| 4,893,263 | 1/1990 | Myers | 361/684 |
| 5,058,045 | 10/1991 | Ma | 361/683 |
| 5,175,671 | 12/1992 | Sasaki | 361/686 |
| 5,290,178 | 3/1994 | Ma | 439/652 |
| 5,602,455 | 2/1997 | Stephens et al. | 320/106 |

*Primary Examiner*—Edward H. Tso
*Attorney, Agent, or Firm*—Fitzpatrick, Cella, Harper & Scinto

[57] ABSTRACT

An electronic apparatus system in which an electronic apparatus such as a personal computer and an expansion device are combined so as to be freely joined and separated. A charging circuit, a control circuit, and a chargeable battery are provided for each of the electronic apparatus and the expansion device. In a state in which the electronic apparatus and the expansion device are separated, the control circuit of the electronic apparatus controls the charging circuit of the electronic apparatus, thereby charging the battery of the electronic apparatus. The control circuit of the expansion device controls the charging circuit of the expansion device, thereby charging the battery of the expansion device.

32 Claims, 10 Drawing Sheets

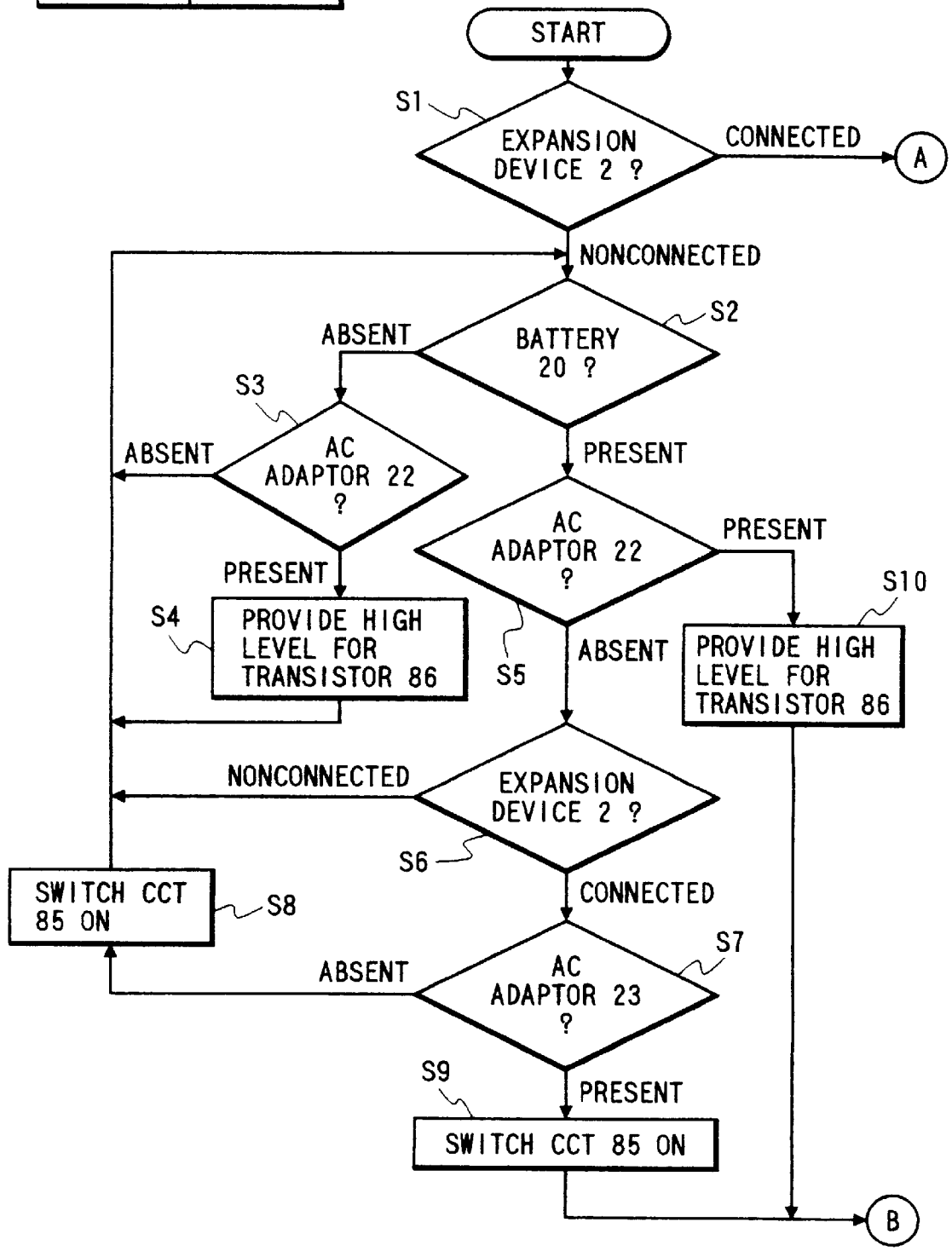

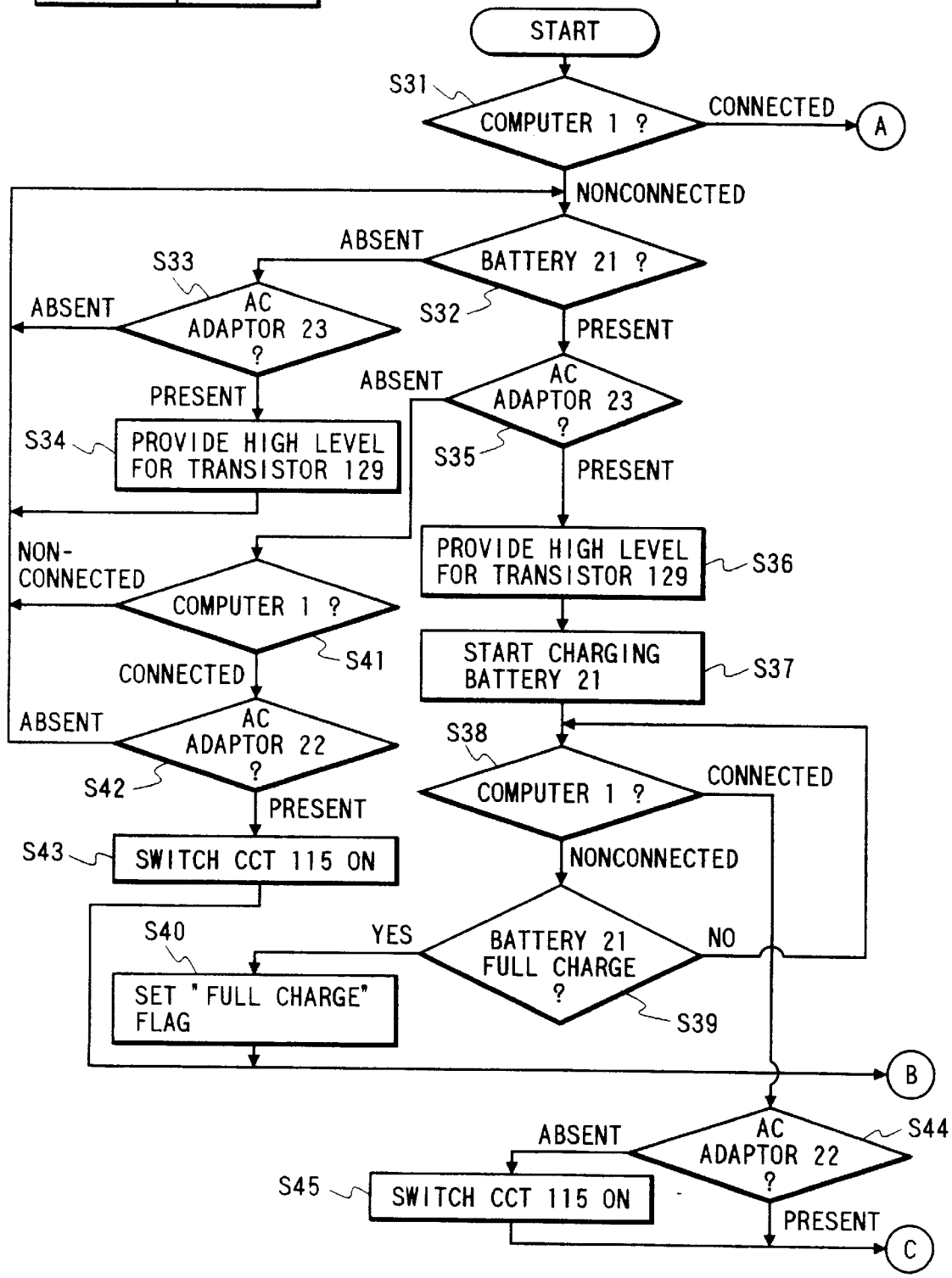

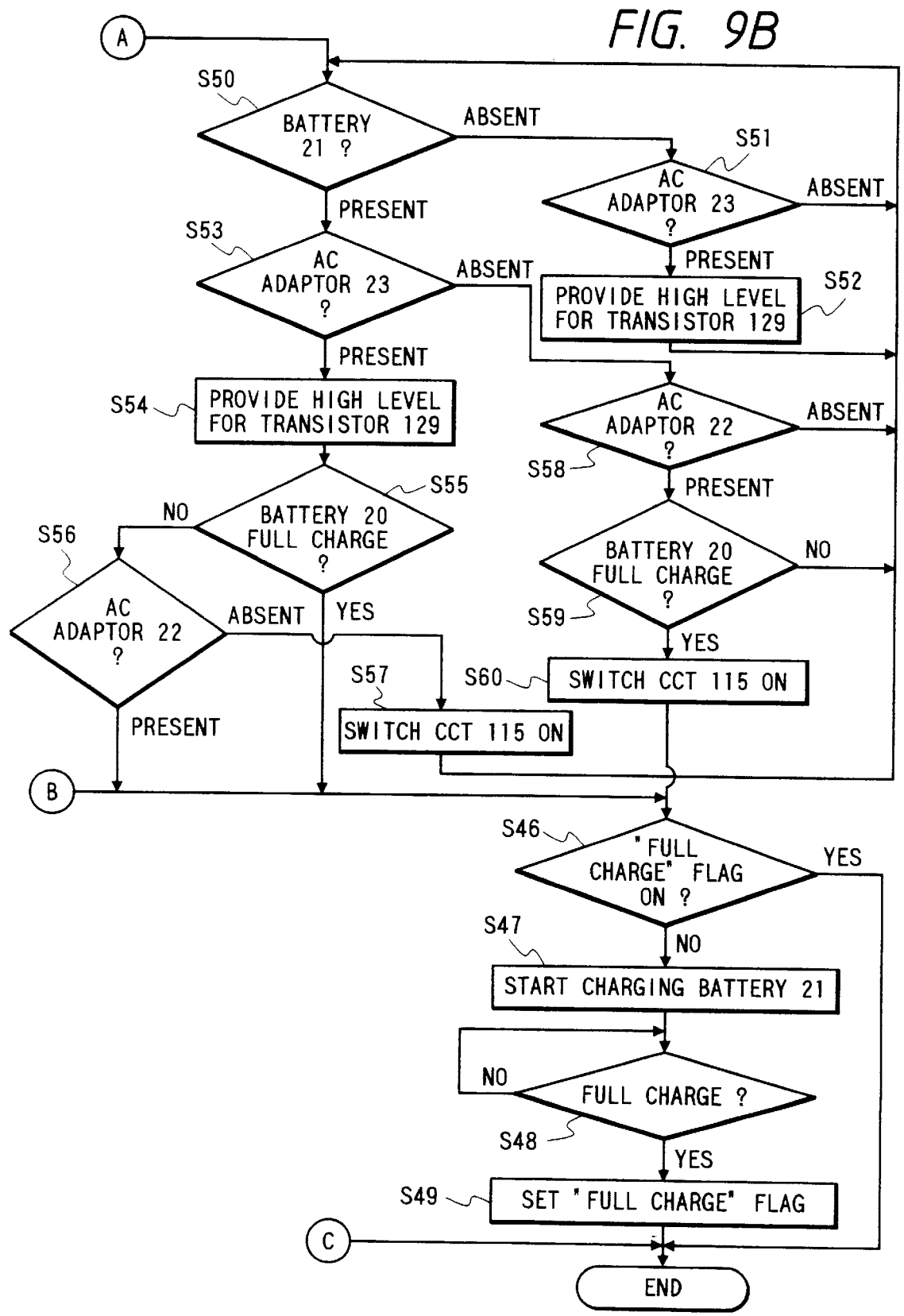

BATTERY CHARGING IN UNITS HAVING ATTACHABLE EXPANSION DEVICES, AND IN SUCH EXPANSION DEVICES

BACKGROUND OF THE INVENTION

1. Field of the Invention

The invention relates to an electronic apparatus system and its charge control method. More particularly, the invention relates to an electronic apparatus system in which an electronic apparatus, an expansion device, and a battery pack are constructed so as to be freely joined and, each have separated (detachable) and a charging function, and to its charge control method.

2. Related Background Art

Hitherto, in order to expand the function of a notebook-sized personal computer or the like, as shown in FIG. 2, a system in which a personal computer (hereinafter, simply referred to as a computer) 1' is combined with an expansion device 2' having therein an FDD, an HDD, or an expansion board or the like by connection of a connector (computer side connector) 3' and a connector (expansion device connector) 4', and two batteries 5' and 6' can be built in the computer 1' permitting operation for a long time has been proposed.

When the batteries 5' and 6' are charged, energy from an AC adapter 7' is supplied to the computer 1' through the connectors 3' and 4', thereby charging the batteries by a charging circuit (not shown).

The conventional personal computer is constructed so that a desk-top type personal computer is separated into a notebook-sized personal computer and an expansion device. The expansion device is designed on the assumption that it is used in a desktop manner as a prerequisite, and its size is large.

However, in the notebook-sized personal computer or the like, it is a present situation that importance is paid to portability and necessary minimum functions are provided for the computer, and thus, a compact size is realized, thereby paying importance to not the portability of only the personal computer itself but also the portability of the computer even when combined with the expansion device. A function to charge with good operability a state of the personal computer, alone the expansion device alone, and the combination of both, is necessary.

SUMMARY OF THE INVENTION

According to the invention, there is provided an electronic apparatus system in which an electronic apparatus and an expansion device can be combined so as to be freely joined and separated, wherein a charging circuit, a control circuit, and a chargeable battery are provided for each of the electronic apparatus and the expansion device. In a state in which the electronic apparatus and the expansion device are separated, the control circuit of the electronic apparatus controls the charging circuit of the electronic apparatus, thereby charging the battery of the electronic apparatus, and the control circuit of the expansion device controls the charging circuit of the expansion device, thereby charging the battery of the expansion device.

There is also provided an electronic apparatus system in which an electronic apparatus and an expansion device are combined so as to be freely joined and separated, and in which a charging circuit, a control circuit, and a chargeable battery are provided for the electronic apparatus, and a control circuit and a power source are provided for the expansion device. When the electronic apparatus and the expansion device are combined, the control circuit of the expansion device supplies electric power from the power source of the expansion device to the electronic apparatus side, and the control circuit of the electronic apparatus controls the charging circuit of the electronic apparatus, thereby charging the battery of the electronic apparatus by electric power from the expansion device.

There is also provided an electronic apparatus system in which an electronic apparatus and an expansion device are combined so as to be freely joined and separated, wherein a control circuit and a power source are provided for the electronic apparatus, and a charging circuit, a control circuit, and a chargeable battery are provided for the expansion device. When the electronic apparatus and the expansion device are combined, the control circuit of the electronic apparatus supplies electric power from the power source to the expansion device side, and the control circuit of the expansion device controls the charging circuit of the expansion device, thereby charging the battery of the expansion device by electric power supplied from the electronic apparatus.

There is also provided an electronic apparatus system in which an electronic apparatus and an expansion device are combined so as to be freely joined and separated, wherein a charging circuit, a control circuit, and a chargeable battery are provided for each of the electronic apparatus and the expansion device. When the electronic apparatus and the expansion device are combined, the control circuit of the expansion device supplies electric power from a power supply source which is connected to the expansion device to the electronic apparatus side and also controls the charging circuit of the expansion device, thereby charging the battery of the expansion device, and the control circuit of the electronic apparatus controls the charging circuit of the electronic apparatus, thereby charging the battery of the electronic apparatus by electric power supplied from the expansion device.

There is also provided an electronic apparatus system in which an electronic apparatus and an expansion device are combined so as to be freely joined and separated, wherein a charging circuit, a control circuit, and a chargeable battery are provided for each of the electronic apparatus and the expansion device. When the electronic apparatus and the expansion device are combined, the control circuit of the electronic apparatus supplies electric power from a power supply source connected to the electronic apparatus to the expansion device side and controls the charging circuit of the electronic apparatus, thereby charging the battery of the electronic apparatus, and the control circuit of the expansion device controls the charging circuit of the expansion device, thereby charging the battery of the expansion device by electric power supplied from the electronic apparatus.

There is also provided an electronic apparatus system in which an electronic apparatus and an expansion device are combined so as to be freely joined and separated, wherein a charging circuit, a control circuit, and a chargeable battery are provided for each of the electronic apparatus and the expansion device. In a state in which the electronic apparatus and the expansion device are separated, when the control circuit of the expansion device controls the charging circuit of the expansion device so as to charge the battery of the expansion device by electric power supplied from the outside, in the case where the electronic apparatus and the expansion device are combined, the control circuit of the expansion device interrupts the charging of the battery of the expansion device and supplies the electronic power from the outside to the electronic apparatus, and the control circuit of the electronic apparatus controls the charging circuit of the electronic apparatus, thereby charging the battery of the electronic apparatus by electronic power supplied from the expansion device.

There is also provided an electronic apparatus system in which an electronic apparatus and an expansion device are combined so as to be freely joined and separated, wherein a charging circuit, a control circuit, and a chargeable battery are provided for each of the electronic apparatus and the expansion device. In a state in which the electronic apparatus and the expansion device are separated, when the control circuit of the electronic apparatus controls the charging circuit of the electronic apparatus so as to charge the battery of the electronic apparatus by electric power supplied from the outside, in the case where the electronic apparatus and the expansion device are combined, the control circuit of the electronic apparatus charges the battery of the electronic apparatus to full charge and, after that, supplies the electronic power supplied from the outside to the expansion device, and the control circuit of the expansion device controls the charging circuit of the expansion device, thereby charging the battery of the expansion device from electronic power supplied from the electronic apparatus.

There is also provided an electronic apparatus system in which an electronic apparatus and an expansion device are combined so as to be freely joined and separated, wherein a charging circuit, a control circuit, and a chargeable battery are provided for each of the electronic apparatus and the expansion device. In a state in which the electronic apparatus and the expansion device are combined, the control circuit of the electronic apparatus controls the charging circuit of the electronic apparatus, thereby charging the battery of the electronic apparatus by an electric power supplied from the outside, and the control circuit of the expansion device controls the charging circuit of the expansion device, thereby charging the battery of the expansion device by electric power supplied from the outside.

There is provided a charge control method for an electronic apparatus system in which an electronic apparatus and an expansion device are combined so as to be freely joined and separated, wherein information indicative of a state of the electronic apparatus and a state of the expansion device is respectively obtained from the electronic apparatus and the expansion device, and charging control is performed in the electronic apparatus and the expansion device on the basis of that information, respectively.

BRIEF DESCRIPTION OF THE DRAWINGS

FIG. 9 is comprised of FIGS. 9A and 9B showing a flowchart for processing by a CPU of the expansion device.

DETAILED DESCRIPTION OF THE PREFERRED EMBODIMENT

An embodiment of the invention will now be described with respect to a notebook-sized personal computer as an example of an electronic apparatus.

Figure 1:
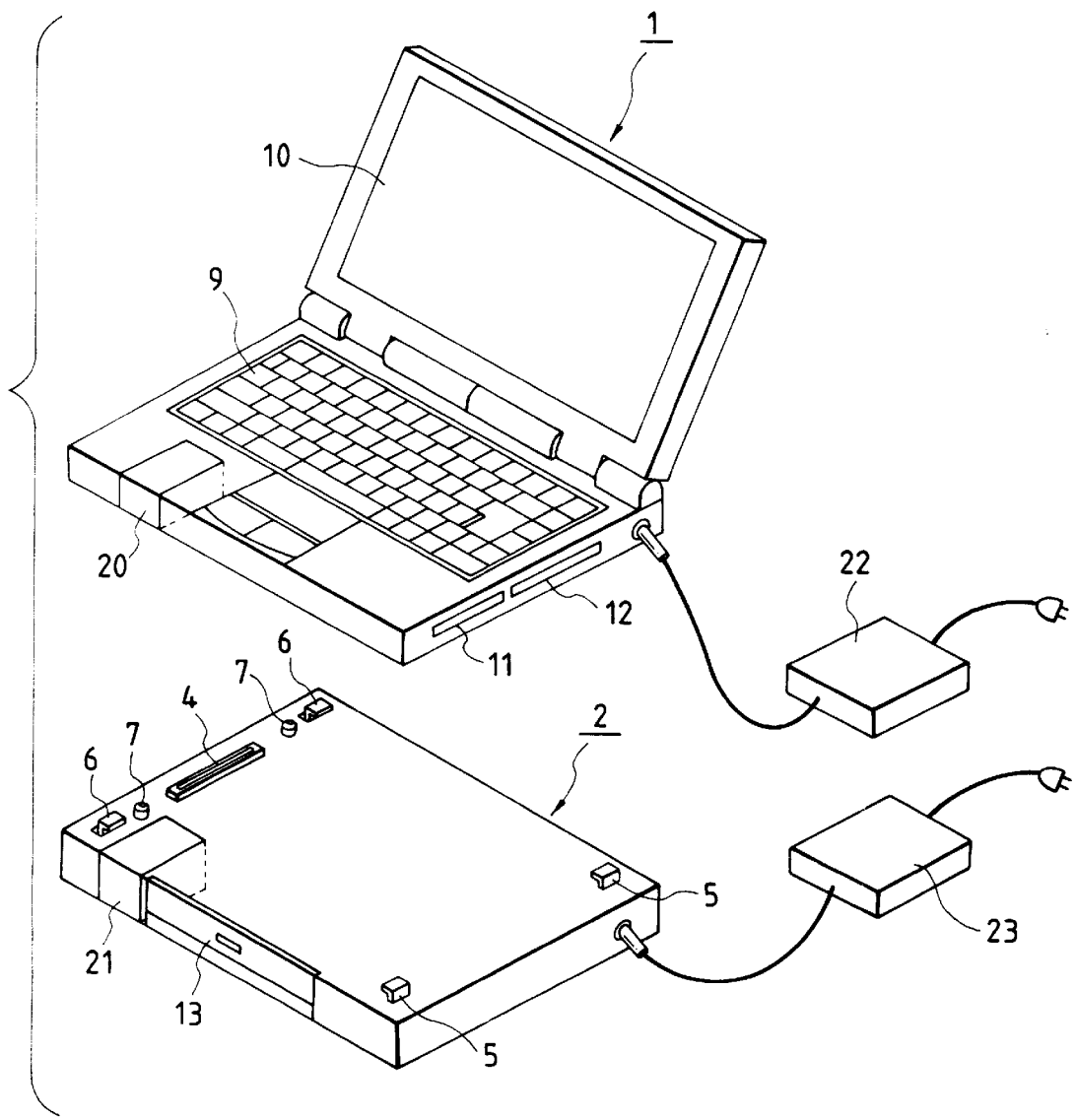
FIG. 1 is a constructional diagram of a notebook-sized personal computer to which the invention is applied.
Figure 2:
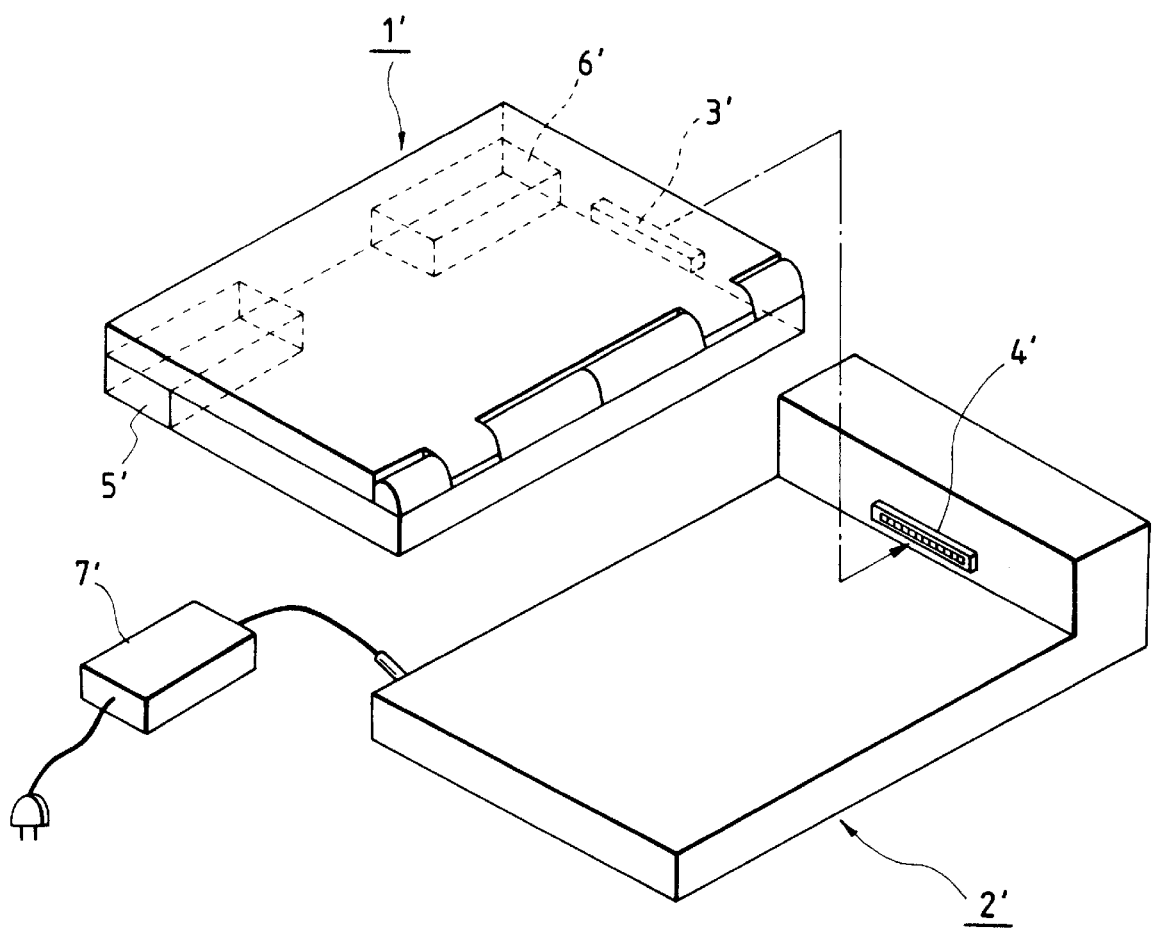
FIG. 2 is a perspective view of a conventional electronic apparatus system.
Figure 3:
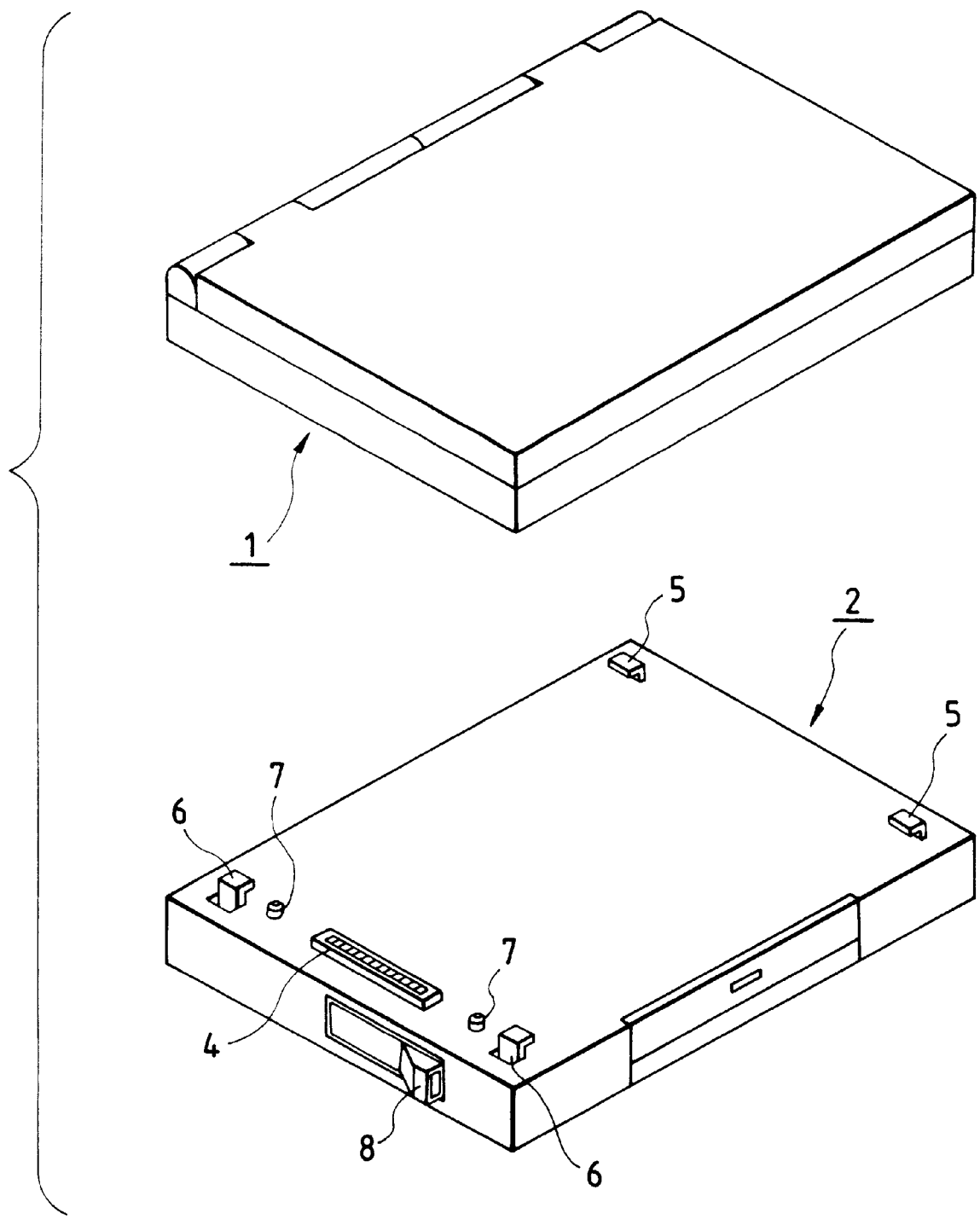
FIG. 3 is a perspective view for explaining a method of combining a personal computer and an expansion device.
Figure 4:
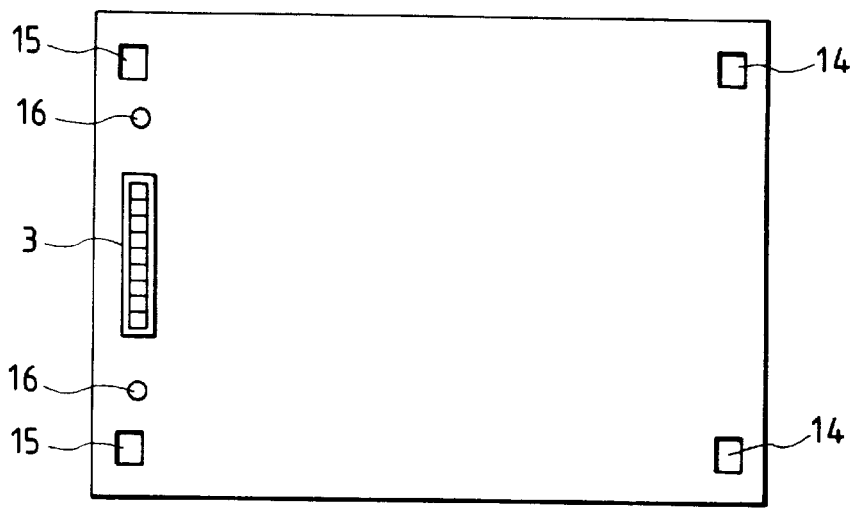
FIG. 4 is a bottom view showing a bottom surface of the personal computer.

FIGS. 1, 3 and 4 show constructional diagrams of the notebook-sized personal computer to which the invention is applied.

In the diagrams, a personal computer (hereinafter, simply referred to as a computer) 1 has a display device 10, a keyboard input device 9, a hard disk drive 11, a floppy disk drive 12, a detachable battery pack (hereinafter, simply referred to as a battery) 20, an electronic circuit (not shown), which will be explained hereinlater, and the like.

An expansion device 2 has therein a CD-ROM drive 13, a detachable battery pack (hereinafter, simply referred to as a battery) 21, an electronic circuit (not shown), and the like.

Each of the detachable batteries 20 and 21 is constructed by eight lithium ion batteries in which four sets of parallel batteries each comprising two batteries are serially connected.

Reference numerals 22 and 23 denote detachable AC adapters for converting 100 ACV to 20 DCV and supplying the converted voltage to the personal computer 1 and expansion device 2, respectively.

Fixed claws 5 are provided on the right side of an upper surface of the expansion device 2 and movable claws 6 which are interlocked with a separation lever (opening/closing lever) 8 (in FIG. 3) are provided on the left side. A connector 4 is arranged between the two movable claws 6 so as to be movable by a micro distance. Projection pins 7 are arranged on both sides of the connector 4.

As shown in FIG. 4, retaining holes 14 adapted to be retained to the fixed claws 5, retaining holes 15 adapted to be retained to the movable claws 6, and engaging holes 16 adapted to be brought into engagement with the projection pins 7 are formed in the back surface of the computer 1, respectively. Reference numeral 3 denotes a connector of the computer 1 which is connected to the connector 4 of the expansion device.

Figure 5:
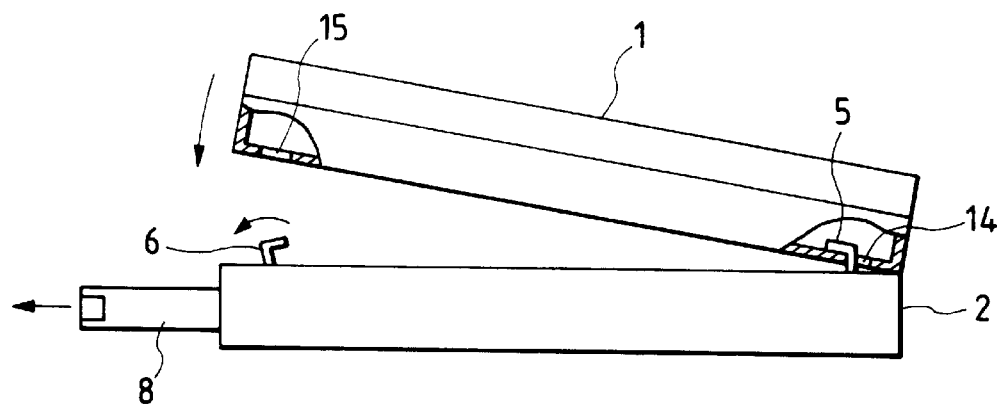
FIG. 5 is a side elevational view for explaining the method of combining the personal computer and the expansion device.
Figure 6:
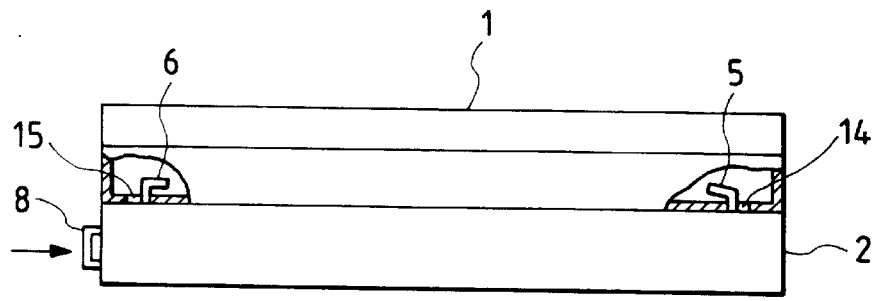
FIG. 6 is a side elevational view for explaining the method of combining the personal computer and the expansion device.

A method of combining the computer 1 and expansion device 2 is shown in FIGS. 5 and 6.

In a state in which the separation lever 8 is opened to the outside and the movable claws 6 are inclined to the outside, the retaining holes 14 on the right side of the computer are hooked to the fixed claws 5 of the-expansion device 2 and, subsequently, the left side of the computer is dropped, thereby connecting the connector. After that, by closing the separation lever 8, the movable claws 6 are retained to the retaining holes 15, thereby completing the combination. The separation is realized by the operation opposite to that described above.

Figure 7:
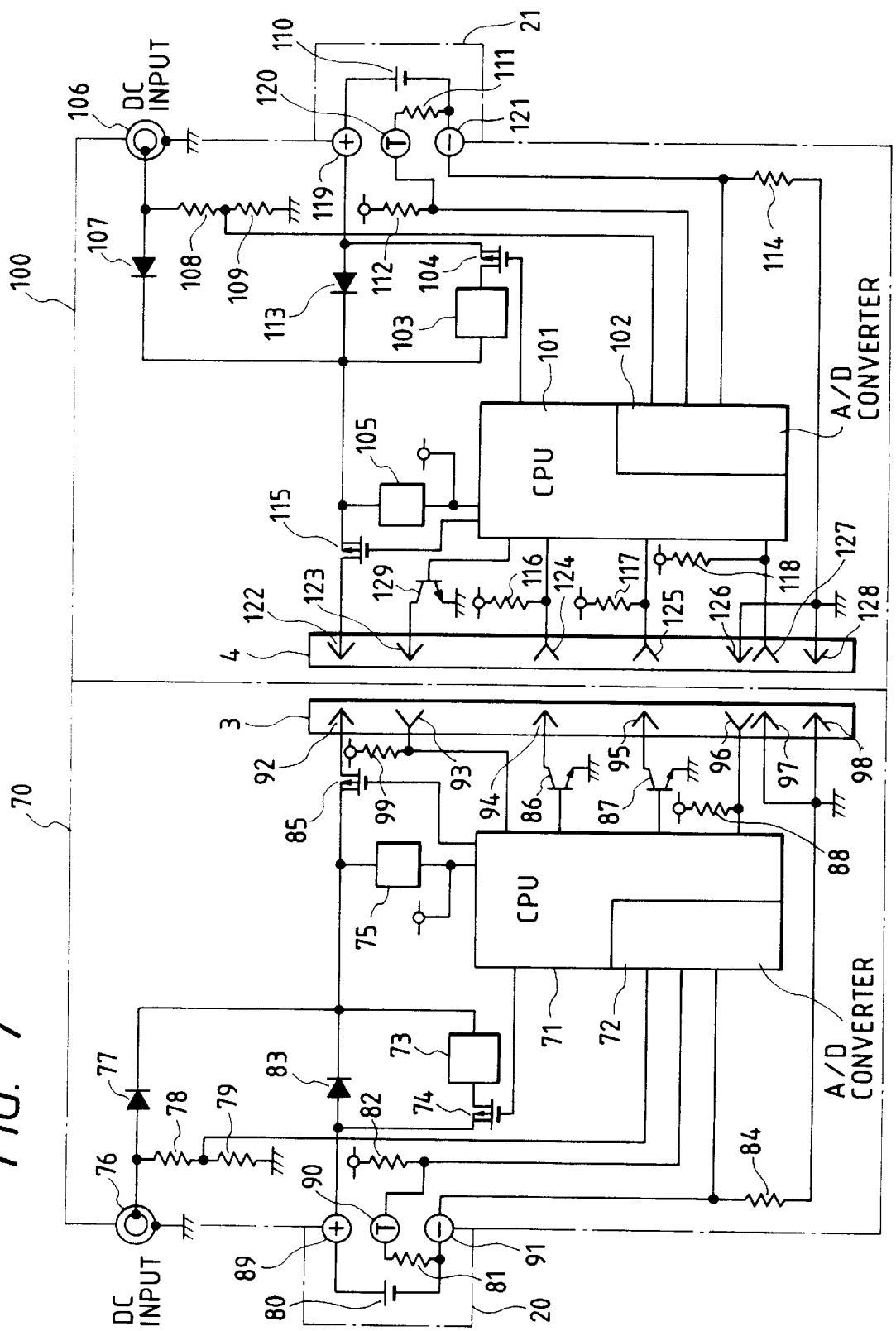
FIG. 7 is a block diagram showing a power supply circuit in the personal computer and power supply circuit in the expansion device.

FIG. 7 shows a block diagram of an electric circuit of a power supply circuit built in each of the computer 1 and expansion device 2.

Reference numeral 70 denotes a power supply circuit built in the computer 1; 100 a power supply circuit built in the expansion device 2; and 20 the foregoing battery pack having therein a cell 80 of the lithium ion battery and a thermistor 81 whose resistance value changes depending on a temperature of the battery. Reference numeral 89 denotes a + terminal for supplying a positive voltage of the battery 20 to the power supply circuit 70; 90 a thermistor terminal for connecting the thermistor 81 to the power supply circuit 70, and 91 a − terminal for supplying a negative voltage of the battery 20 to the power supply circuit 70.

Reference numeral 21 denotes the foregoing battery pack having therein a cell 110 of the lithium ion battery and a thermistor 111 whose resistance value changes depending on a temperature of the battery. Reference numeral 119 denotes a + terminal for supplying a positive voltage of the battery 21 to the power supply circuit 100, 120 a thermistor terminal for connecting the thermistor 111 to the power supply circuit 100; and 121 a − terminal for supplying a negative voltage of the battery 21 to the power supply circuit 100.

Reference numerals 3 and 4 denote the foregoing connectors. Reference numerals (92 and 122), (93 and 123), (94 and 124), (95 and 125), (96 and 126), (97 and 127), and (98 and 128) denote pairs of terminals arranged in the connectors 3 and 4. Reference numerals 92 and 122 denote the power terminals for supplying an electric power from the power supply circuit 70 to the power supply circuit 100 or from the power supply circuit 100 to the power supply circuit 70. Reference numerals 93 and 123 denote expansion device "AC-connected" terminals for informing the power supply circuit 70 from the power supply circuit 100 of a discriminating result about whether electric power has been supplied from the AC adapter 23 to the power supply circuit 100 or not. The expansion device "AC-connected" terminal 93 shows the high level when no AC adapter is connected to the expansion device 2 or the computer 1 and expansion device 2 are separated. When the AC adapter is connected to the expansion device 2, the terminal 93 indicates the low level.

Reference numerals 94 and 124 denote personal computer "AC-connected" terminals for informing the power supply circuit 100 from the power supply circuit 70 of a discrimination result about whether the electric power has been supplied from AC adapter 22 to the power supply circuit 70 or not. The personal computer "AC-connected" terminal 124 shows the high level when no AC adapter is connected to the personal computer or when the computer 1 and expansion device 2 are separated. When the AC adapter is connected to the personal computer, the terminal 124 indicates the low level.

Reference numerals 95 and 125 denote the personal computer battery full charge terminals for informing the power supply circuit 100 from the power supply circuit 70 of a discrimination result about whether the battery 20 has been fully charged or not. The personal computer battery full charge terminal 125 indicates the high level when the battery of the personal computer is not fully charged or when the computer 1 and expansion device 2 are separated. When the personal computer battery 20 is fully charged, the terminal 125 indicates the low level.

Reference numerals 96 and 126 denote the expansion device connection terminals for detecting whether the power supply circuit 70 is connected to the power supply circuit 100 or not. When the computer 1 and expansion device 2 are separated, the expansion device connection terminal 96 indicates the high level. When the computer 1 and expansion device 2 are combined, the terminal 96 shows the low level.

Reference numerals 97 and 127 denote the personal computer connection terminals for detecting whether the power supply circuit 70 is connected to the power supply circuit 100 or not. When the computer 1 and expansion device 2 are separated, the personal computer connection terminal 127 indicates the high level. When the computer 1 and expansion device 2 are combined, the terminal 127 shows the low level. Reference numerals 98 and 128 denote the ground terminals.

Reference numeral 71 denotes a one-chip CPU having therein an A/D converter 72. The CPU 71 performs a charge control in the embodiment on the basis of a control procedure which has previously been stored. Reference numeral 101 denotes a one-chip CPU having therein an A/D converter 102. The CPU 101 performs a charge control in the embodiment on the basis of a control procedure which has previously been stored.

Reference numeral 99 denotes a pull-up resistor for connecting the expansion device "AC-connected" terminal 93 to the power source; 116 a pull-up resistor for connecting the personal computer "AC-connected" terminal 124 to the power source; 117 a pull-up resistor for connecting the personal computer battery full charge terminal 125 to the power source; 88 a pull-up resistor for connecting the expansion device connection terminal 96 to the power source; and 118 a pull-up resistor for connecting the personal computer connection terminal 127 to the power source.

Reference numeral 129 denotes a transistor for inverting a signal from the CPU 101 and transmitting to the expansion device "AC-connected" terminal 123; 86 a transistor for inverting a signal from the CPU 71 and transmitting to the personal computer "AC-connected" terminal 94; and 87 a transistor for inverting the signal from the CPU 71 and transmitting to the personal computer battery full charge terminal 95.

Reference numeral 82 denotes a pull-up resistor for connecting the thermistor terminal 90 to the power source. The voltage divided by the thermistor 81 and pull-up resistor 82 is read by the A/D converter 72, thereby detecting a temperature of the battery pack 20 and discriminating whether the battery pack 20 is connected to the power supply circuit 70 of the computer 1 or not. When the value read by the A/D converter 72 is equal to 5V, this means that the battery pack 20 is not connected to the power supply circuit 70 of the computer 1. In case of the other values, it indicates the temperature of the battery pack 20.

Reference numeral 112 denotes a pull-up resistor for connecting the thermistor terminal 120 to the power source. The voltage divided by the thermistor 111 and pull-up resistor 112 is read by the A/D converter 102, thereby detecting a temperature of the battery pack 21 and discriminating whether the battery pack 21 is connected to the power supply circuit 100 of the expansion device 2 or not. When the value read by the A/D converter 102 is equal to 5V, this means that the battery pack 21 is not connected to the power supply circuit 100 of the expansion device 2. In case of the other values, it indicates the temperature of the battery pack 21.

Reference numeral 76 denotes a DC input terminal to which the AC adapter 22 is connected; 78 and 79 indicate voltage dividing resistors for dividing the voltage from the AC adapter 22. By measuring the divided voltage through the A/D converter 72, the CPU 71 discriminates whether the AC adapter 22 is connected (the AC adapter is present) or not (the AC adapter is absent). In case of 0V, it means that no AC adapter is connected. In case of the other values, this means that the AC adapter is connected. When the presence of the AC adapter 22 is determined, the CPU 71 generates a high level signal to the transistor 86.

Reference numeral 106 denotes a DC input terminal to which the AC adapter 23 is connected; 108 and 109 indicate voltage dividing resistors for dividing a voltage from the AC adapter 23. By measuring the divided voltage through the A/D converter 102, the CPU 101 discriminates the presence or absence of the AC adapter 23. In case of 0V, this means that the AC adapter is absent. In case of the other values, this means that the AC adapter is present. When the presence of the AC adapter 23 is determined, the CPU 101 generates a high level signal to the transistor 129.

Reference numeral 84 denotes a charge current detecting resistor. The CPU 71 detects a charge current by measuring a voltage of the detecting resistor 84 by the A/D converter 72. Reference numeral 114 denotes a charge current detecting resistor. The CPU 101 detects a charge current by measuring the voltage of the detecting resistor 114 by the A/D converter 102.

Reference numeral 75 denotes a power supply circuit for supplying power to the CPU 71 and the other circuits; 77 a diode for supplying electric power from the AC adapter 22 to the power supply circuit 75; and 83 a diode for supplying electric power from the battery 20 to the power supply circuit 75; 105 a power supply circuit for supplying power to the CPU 101 and the other circuits; 107 a diode for supplying the electric power from the AC adapter 23 to the power supply circuit 105; and 113 a diode for supplying electric power from the battery 21 to the power supply circuit 105.

Reference numeral 73 denotes a constant voltage constant current circuit for converting 20V from the AC adapter into 16.4V, which is used to charge the battery 20; 74 a switch circuit for turning on/off the charging operation; 103 a constant voltage constant current circuit for converting 20V from the AC adapter into 16.4V and it is used to charge the battery 21; 104 a switch circuit to turn on/off the charging operation; 85 a switch circuit for transmitting electric power from the computer 1 to the expansion device 2 or for transmitting electric power from the expansion device 2 to the computer 1; and 115 a switch circuit for transmitting electric power from the computer 1 to the expansion device 2 or for transmitting electric power from the expansion device 2 to the computer 1.

Figure 10:
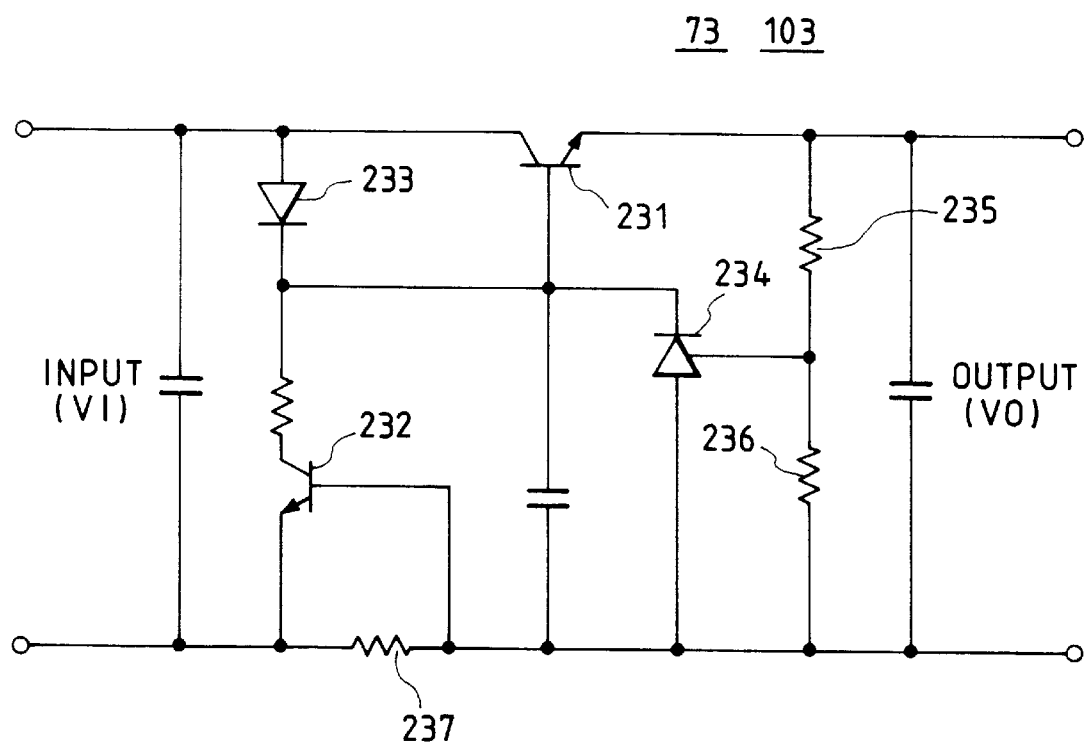
FIG. 10 shows an example of a circuit diagram of constant voltage constant current circuits 73 and 103.

An example of a circuit diagram of the constant voltage constant current circuits 73 and 103 is shown in FIG. 10.

In the diagram, reference numerals 231 and 232 denote transistors; 233 a constant current diode; 234 a shunt regulator; 235 and 236 voltage dividing resistors for forming a reference voltage from the shunt regulator 234; and 237 a resistor.

The operations of the constant voltage constant current circuits 73 and 103 will now be described. When an output $V_O$ increases, the voltage divided by the voltage dividing resistors 235 and 236 also increases and the reference voltage of the shunt regulator 234 increases. In association with it, a current Ik flowing to the shunt regulator 234 increases. Since the sum of currents flowing to the shunt regulator 234 and transistors 231 and 232 is made constant by the constant current diode 233, when the current Ik increases, a base current Ib of the transistor 231 decreases and the output $V_O$ decreases. When the output $V_O$ decreases, a phenomenon opposite to that described above occurs and the constant voltage is held.

When a load current increases by being connected to the output, a voltage drop of the resistor 237 increases. In response to it, a voltage between the base and emitter of the transistor 232 increases and a collector current Ic increases. When the collector current Ic increases, the base current Ib of the transistor 231 decreases as mentioned above, so that the load current decreases. When the load current is reduced, a phenomenon opposite to that described above occurs, so that the constant current is held.

A procedure corresponding to various patterns in the case where the user connects the battery 20 to the computer 1 and charges the battery will now be described.

Figure 8B:
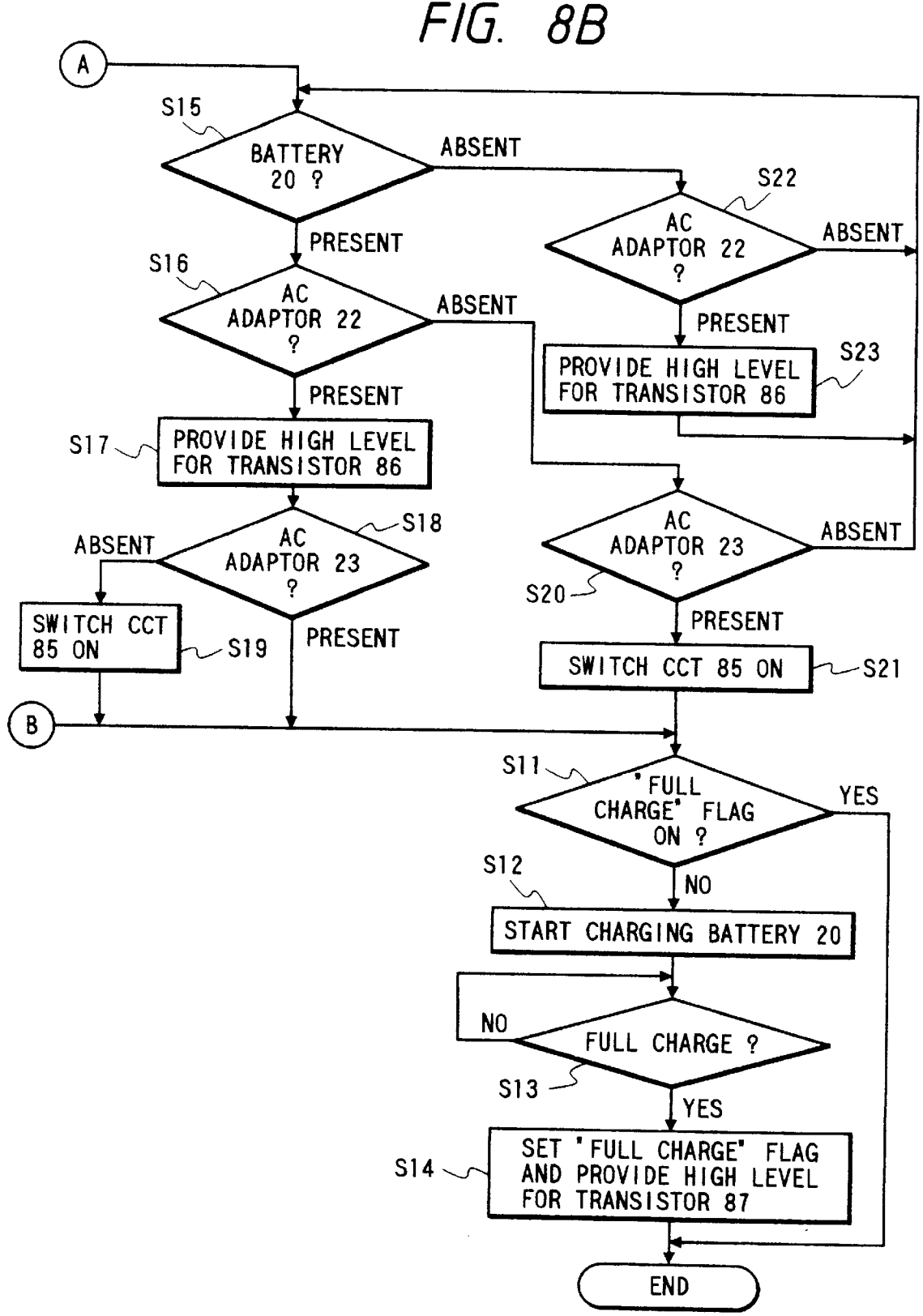
FIG. 8 is comprised of FIGS. 8A and 8B showing a flowchart for processing by a CPU of the personal computer.

FIGS. 8A and 8B show a charge control flow which is executed by the CPU 71. When the charge control is started, the CPU 71 determines that the computer 1 and expansion device 2 are connected when the state of the expansion device connection terminal 96 is at the low level and that the computer 1 and expansion device 2 are not connected when the terminal 96 is at the high level (step S1). When it is decided that they are not connected, a check is made to see if the battery 20 is connected to the computer 1 (step S2). When the absence of the battery 20 is determined, a check is made to see if the AC adapter 22 is connected to the computer 1 (step S3). When it is determined that the AC adapter 22 is not connected to the computer 1, the processing routine is returned to the step of checking the connection of the battery 20. When the battery 20 is connected, the high level signal is outputted to the transistor 86 and the processing routine is returned to the step of checking the connection of the battery 20 (step S4).

When it is decided in step S2 that the battery 20 is present, a check is made to see if the AC adapter 22 is connected to the computer 1 (step S5). When it is decided that the AC adapter 22 is not connected to the computer 1, the expansion device 2 is connected to the computer 1 when the expansion device connection terminal 96 is at the low level, and it is determined that the expansion device 2 is not connected to the computer 1 when the terminal 96 is at the high level (step S6).

In step S6, when it is determined that the expansion device 2 is not connected, the processing routine is returned to the step of checking the connection of the battery 20. When it is decided that the expansion device 2 is connected, whether the AC adapter 23 is connected to the expansion device 2 or not is discriminated by checking the level of the expansion device "AC-connected" terminal 93 (step S7). When it is decided that the AC adapter 23 is not connected to the expansion device 2, the switch circuit 85 is turned on and the processing routine is returned to step S2 of checking the connection of the battery 20. When it is connected, the switch circuit 85 is turned on (step S9).

When it is determined in step S5 that the AC adapter 22 is connected to the computer 1, the high level signal is outputted to the transistor 86 (step S10).

Subsequently, a check is made to see if a "full charge" flag set in a register (not shown) in the CPU 71 indicates a full charge (step S11). If NO, the charging of the personal computer side battery 20 is started by turning on the switch circuit 74 (step S12). The CPU 71 checks the charge current by measuring a voltage of the current detecting resistor 84 by the A/D converter 72 and determines the full charge when the charge current is equal to or less than 100 mA (step S13). When the full charge is detected, a "full charge" flag is set into the register (not shown) in the CPU 71 and the high level signal is outputted to the transistor 87 (step S14).

When it is determined in step S1 that the computer 1 and expansion device 2 are connected, a check is first made to see if the personal computer side battery 20 is present (step S15). When the battery 20 is absent, a check is made to see if the personal computer side AC adapter 22 is present (step S22). When the AC adapter 22 is present, the high level signal is outputted to the transistor 86 (step S23). When the absence of the AC adapter 22 is decided in step S22 and step S23 is finished, the processing routine is returned to step S15.

When it is decided in step S15 that the battery 20 is present, a check is made to see if the personal computer side AC adapter 22 is present (step S16). When the AC adapter 22 is present, the high level signal is outputted to the transistor 86 (step S17). The CPU 71 discriminates whether the AC adapter 23 is present in the expansion device 2 or not by checking the state of the expansion device "AC-connected" terminal 93 (step S18). When the AC adapter 23 is present, step S11 follows. When the AC adapter 23 is absent, the switch circuit 85 is turned on and the processing routine advances to step S11 (step S19). When it is determined in step S16 that the personal computer side AC adapter 22 is absent, the CPU 71 discriminates the presence or absence of the expansion device AC adapter 23 by checking the state of the expansion device "AC-connected" terminal 93 (step S20). When the expansion device AC adapter 23 is absent, the processing routine is returned to step S15. When it is present, the switch circuit 85 is turned on (step S21).

The operation of the expansion device CPU 101 will now be described. FIGS. 9A and 9B show a charging flow which is executed by the CPU 101.

When the charge control is started, the CPU 101 discriminates whether the computer 1 and expansion device 2 are connected by checking the state of the personal computer connection terminal 127 (step S31). When they are not connected, a check is made to see if the expansion device side battery 21 is connected (step S32). When the battery 21 is not connected, a check is made to see if the expansion device AC adapter 23 is connected (step S33). When the AC adapter 23 is not connected, the processing routine is returned to step S32. When it is connected, the high level signal is outputted to the transistor 129 and the processing routine is returned to step S32 (step S34).

When it is decided in step S32 that the expansion device side battery 21 is present, a check is made to see if the expansion device AC adapter 23 is present (step S35). When the expansion device AC adapter 23 is present, the high level signal is outputted to the transistor 129 (step S36). The CPU 101 turns on the switch circuit 104 and starts to charge the battery 21 (step S37). The CPU 101 discriminates whether the computer 1 is connected to the expansion device 2 by checking the state of the personal computer connection terminal 127. When it is connected, the processing routine advances to step S44, which will be explained hereinlater. When it is not connected, the processing routine advances to the next step (step S38).

Subsequently, the CPU 101 detects whether the battery 21 has been fully charged or not by measuring the voltage of the current detecting resistor 114 by the A/D converter 102 and determines the full charge when the charge current is equal to or less than 100 mA (step S39). When the full charge is detected, the "full charge" flag is set into the register (not shown) in the CPU 101 mentioned above (step S40).

When the expansion device AC adapter 23 is absent in step S35, the CPU 101 discriminates whether the computer 1 is connected to the expansion device 2 or not by checking the state of the personal computer connection terminal 127. When it is not connected, the processing routine is returned to step S32 and, when it is connected, the next step follows (step S41). A check is made to see if the personal computer side AC adapter 22 is present. If NO, the processing routine is returned to step S32 (step S42). When the AC adapter 22 is present, the switch circuit 115 is turned on (step S43). When the computer 1 is connected in step S38, a check is made to see if the personal computer side AC adapter 22 is present (step S44). If YES, the flow is finished. If NO, the switch circuit 115 is turned on (step S45).

Subsequently, a check is made to see if the "full charge" flag set in the register (not shown) in the CPU 101 indicates the full charge (step S46). If YES, the flow is finished. If NO, the charging of the expansion device side battery 21 is started by turning on the switch circuit 104 (step S47). The CPU 101 discriminates the charge current by measuring the voltage of the current detecting resistor 114 by the A/D converter 102 and determines the full charge when the charge current is equal to or less than 100 mA (step S48). When the full charge is detected, the "full charge" flag is set into the register (not shown) in the CPU 101 mentioned above (step S49).

When it is decided in step S31 that the computer 1 and expansion device 2 are connected, a check is first made to see if the expansion device battery 21 is present (step S50). When the battery 21 is absent, a check is made to see if the expansion device AC adapter 23 is present (step S51). When the AC adapter 23 is present, the high level signal is outputted to the transistor 129 (step S52). When the AC adapter 22 is absent in step S51 and step S52 is finished, the processing routine is returned to step S50. When the battery 21 is present in step S50, a check is made to see if the expansion device AC adapter 23 is present (step S53).

When the AC adapter 23 is present, the high level signal is outputted to the transistor 129 (step S54). The CPU 101 discriminates whether the personal computer battery 20 has fully been charged or not by checking the state of the personal computer battery full charge terminal 125 (step S55). When it is fully charged, step S46 follows. If NO, the CPU 101 checks to see if the AC adapter 22 is present in the personal computer by checking the state of the personal computer "AC-connected" terminal 124 (step S56). When the AC adapter 22 is present, step S46 follows and when it is absent, the switch circuit 115 is turned on and the processing routine is returned to step S50 (step S57).

When the expansion device AC adapter 23 is absent in step S53, the CPU 101 discriminates the presence or absence of the personal computer AC adapter 22 by checking the state of the personal computer "AC-connected" terminal 124 (step S58). When the personal computer AC adapter 22 is absent, the processing routine is returned to step S50. When it is present, the CPU 101 discriminates whether the personal computer battery 20 has fully been charged or not by checking the state of the personal computer battery full charge terminal 125 (step S59). When it is not fully charged, the processing routine is returned to step S50 and when it is fully charged, the switch circuit 115 is turned on and the processing routine advances to step S46 (step S60).

According to the embodiment as described above, each of the electronic apparatus and the expansion device has the power source and the use of the power source, the charging, and the like can be efficiently performed with a high operability in accordance with the connecting state of the electronic apparatus and the expansion device.

According to the invention as described above, in the electronic apparatus system which is freely joined and separated, the charging function of the electronic apparatus with a good operability can be realized irrespective of a state of the system such as state of only the electronic apparatus, state of only the expansion device, or combined state thereof.

What is claimed is:

1. An electronic apparatus system in which an electronic apparatus and an expansion device are combined so as to be freely joined and separated, wherein a charging circuit, a control circuit, and a chargeable battery are provided for each of said electronic apparatus and said expansion device, in a state in which said electronic apparatus and said expansion device are separated, said control circuit of the electronic apparatus controls said charging circuit of the electronic apparatus, thereby charging said battery of the electronic apparatus, and said control circuit of the expansion device controls said charging circuit of the expansion device, thereby charging said battery of the expansion device.

2. An electronic apparatus system in which an electronic apparatus and an expansion device are combined so as to be freely joined and separated, wherein a charging circuit, a control circuit, and a chargeable battery are provided for said electronic apparatus, a control circuit and a power source are provided for said expansion device, and when the electronic apparatus and the expansion device are combined, said control circuit of the expansion device supplies electric power from said power source of the expansion device to the electronic apparatus side, and said control circuit of the electronic apparatus controls said charging circuit of the electronic apparatus, thereby charging said battery of the electronic apparatus by electric power from the expansion device.

3. An electronic apparatus system in which an electronic apparatus and an expansion device are combined so as to be freely joined and separated, wherein a control circuit and a power source are provided for said electronic apparatus, a charging circuit, a control circuit, and a chargeable battery are provided for said expansion device, and when the electronic apparatus and the expansion device are combined, said control circuit of the electronic apparatus supplies electric power from said power source of the electronic apparatus to the expansion device side, and said control circuit of the expansion device controls said charging circuit of the expansion device, thereby charging said battery of the expansion device by electric power supplied from the electronic apparatus.

4. An electronic apparatus system in which an electronic apparatus and an expansion device are combined so as to be freely joined and separated, wherein a charging circuit, a control circuit, and a chargeable battery are provided for each of said electronic apparatus and said expansion device, and when the electronic apparatus and the expansion device are combined, said control circuit of the expansion device supplies electric power from a power supply source connected to the expansion device to the electronic apparatus side and also controls said charging circuit of the expansion device, thereby charging said battery of the expansion device, and said control circuit of the electronic apparatus controls said charging circuit of the electronic apparatus, thereby charging said battery of the electronic apparatus by electric power supplied from the expansion device.

5. A system according to claim 4, wherein priorities of the batteries to be charged are set to the order of the battery of said electronic apparatus and the battery of said expansion device.

6. An electronic apparatus system in which an electronic apparatus and an expansion device are combined so as to be freely joined and separated, wherein a charging circuit, a control circuit, and a chargeable battery are provided for each of said electronic apparatus and said expansion device, and when the electronic apparatus and the expansion device are combined, said control circuit of the electronic apparatus supplies electric power from a power supply source connected to the electronic apparatus to the expansion device side and also controls said charging circuit of the electronic apparatus, thereby charging said battery of the electronic apparatus, and said control circuit of the expansion device controls said charging circuit of the expansion device, thereby charging said battery of the expansion device by electric power supplied from the electronic apparatus.

7. A system according to claim 6, wherein priorities of the batteries to be charged are set to the order of the battery of said electronic apparatus and the battery of said expansion device.

8. An electronic apparatus system in which an electronic apparatus and an expansion device are combined so as to be freely joined and separated, wherein a charging circuit, a control circuit, and a chargeable battery are provided for each of said electronic apparatus and said expansion device, and in a state in which the electronic apparatus and the expansion device are separated, when said control circuit of the expansion device controls said charging circuit of the expansion device and charges said battery of the expansion device by electric power supplied from the outside, in the case where the electronic apparatus and the expansion device are combined, said control circuit of the expansion device interrupts a charging of said battery of the expansion device and supplies the electric power from the outside to the electronic apparatus, and said control circuit of the electronic apparatus controls said charging circuit of the electronic apparatus, thereby charging said battery of the electronic apparatus by electric power supplied from the expansion device.

9. A system according to claim 8, wherein when said battery of said electronic apparatus is fully charged, said control circuit of said expansion device restarts to charge said battery of the expansion device.

10. An electronic apparatus system in which an electronic apparatus and an expansion device are combined so as to be freely joined and separated, wherein a charging circuit, a control circuit, and a chargeable battery are provided for each of said electronic apparatus and said expansion device, and in a state in which the electronic apparatus and the expansion device are separated, when said control circuit of the electronic apparatus controls said charging circuit of the electronic apparatus and charges said battery of the electronic apparatus by electric power supplied from the outside, in the case where the electronic apparatus and the expansion device are combined, said control circuit of the electronic apparatus charges said battery of the electronic apparatus up to a full charge and, after that, supplies electric power supplied from the outside to the expansion device, and said control circuit of the expansion device controls said charging circuit of the expansion device, thereby charging said battery of the expansion device by electric power from the electronic apparatus.

11. An electronic apparatus system in which an electronic apparatus and an expansion device are combined so as to be freely joined and separated, wherein a charging circuit, a control circuit, and a chargeable battery are provided for each of said electronic apparatus and said expansion device, and in a state in which the electronic apparatus and the expansion device are combined, said control circuit of the electronic apparatus controls said charging circuit of the electronic apparatus and charges said battery of the electronic apparatus by electric power supplied from the outside, and said control circuit of the expansion device controls said charging circuit of the expansion device, thereby charging said battery of the expansion device by the electric power supplied from the outside.

12. A system according to claim 1, further having storage means for storing information indicative of a state of said electronic apparatus and a state of said expansion device, wherein said control circuit of each of said electronic apparatus and said expansion device performs the control on the basis of the information stored in said storage means.

13. A system according to claim 2, further having storage means for storing information indicative of a state of said electronic apparatus and a state of said expansion device, wherein said control circuit of each of said electronic apparatus and said expansion device performs the control on the basis of the information stored in said storage means.

14. A system according to claim 3, further having storage means for storing information indicative of a state of said electronic apparatus and a state of said expansion device, wherein said control circuit of each of said electronic apparatus and said expansion device performs the control on the basis of the information stored in said storage means.

15. A system according to claim 4, further having storage means for storing information indicative of a state of said electronic apparatus and a state of said expansion device, wherein said control circuit of each of said electronic apparatus and said expansion device performs the control on the basis of the information stored in said storage means.

16. A system according to claim 5, further having storage means for storing information indicative of a state of said electronic apparatus and a state of said expansion device, wherein said control circuit of each of said electronic apparatus and said expansion device performs the control on the basis of the information stored in said storage means.

17. A system according to claim 6, further having storage means for storing information indicative of a state of said electronic apparatus and a state of said expansion device, wherein said control circuit of each of said electronic apparatus and said expansion device performs the control on the basis of the information stored in said storage means.

18. A system according to claim 7, further having storage means for storing information indicative of a state of said electronic apparatus and a state of said expansion device, wherein said control circuit of each of said electronic apparatus and said expansion device performs the control on the basis of the information stored in said storage means.

19. A system according to claim 8, further having storage means for storing information indicative of a state of said electronic apparatus and a state of said expansion device, wherein said control circuit of each of said electronic apparatus and said expansion device performs the control on the basis of the information stored in said storage means.

20. A system according to claim 9, further having storage means for storing information indicative of a state of said electronic apparatus and a state of said expansion device, wherein said control circuit of each of said electronic apparatus and said expansion device performs the control on the basis of the information stored in said storage means.

21. A system according to claim 10, further having storage means for storing information indicative of a state of said electronic apparatus and a state of said expansion device, wherein said control circuit of each of said electronic apparatus and said expansion device performs the control on the basis of the information stored in said storage means.

22. A system according to claim 11, further having storage means for storing information indicative of a state of said electronic apparatus and a state of said expansion device, wherein said control circuit of each of said electronic apparatus and said expansion device performs the control on the basis of the information stored in said storage means.

23. A method for use in an electronic apparatus system in which an electronic apparatus and an expansion device are combined so as to be freely joined and separated, in which a charging circuit, a control circuit and a chargeable battery are provided for each of the electronic apparatus and the expansion device, comprising the steps of:

when the electronic apparatus and the expansion device are combined, using the control circuit of the expansion device to supply electric power from a power supply source connected to the expansion device to the electronic apparatus side, and using the control circuit of the expansion device to control the charging circuit of the expansion device, thereby charging the battery of the expansion device, and the control circuit of the electronic apparatus, thereby charging the battery of the electronic apparatus by electric power supplied from the expansion device.

24. A method according to claim 23, wherein priorities of the batteries to be charged are set to the order of the battery of the electronic apparatus and the battery of the electronic apparatus and the battery of the expansion device.

25. A method for use in an electronic apparatus system in which an electronic apparatus and an expansion device are combined so as to be freely joined and separated, wherein a charging circuit, a control circuit and a chargeable battery are provided for each of the electronic apparatus and the expansion device, comprising the steps of:

when the electronic apparatus and the expansion device are combined, using the control circuit of the electronic apparatus to supply electric power from a power supply source connected to the electronic apparatus to the expansion device side, and using the control circuit of the electronic apparatus to control the charging circuit of the electronic apparatus, thereby charging the battery of the electronic apparatus, and using the control circuit of the expansion device to control the charging circuit of the expansion device, thereby charging the battery of the expansion device by electric power supplied from the electronic apparatus.

26. A method according to claim 25, wherein priorities of the batteries to be charged are set to the order of the battery of the electronic apparatus and the battery of the expansion device.

27. A method for use in an electronic apparatus system in which an electronic apparatus and an expansion device are combined so as to be freely joined and separated, wherein a charging circuit, a control circuit, and a chargeable battery are provided for each of the electronic apparatus and the expansion device, comprising the steps of:

in a state in which the electronic apparatus and the expansion device are separated, when the control circuit of the electronic apparatus controls the charging circuit of the electronic apparatus and charges the battery of the electronic apparatus by electric power supplied from the outside, in the case where the electronic apparatus and the expansion device are combined, using the control circuit of the electronic apparatus to charge the battery of the electronic apparatus up to a full charge and, after that, using the control circuit of the electronic apparatus to supply electric power supplied from the outside to the expansion device, and using the control circuit of the expansion device to control the charging circuit of the expansion device, thereby charging the battery of the expansion device by electric power from the electronic apparatus.

28. A method according to claim 23, further comprising the step of storing information indicative of a state of the electronic apparatus and a state of the expansion device, wherein the control circuit of each of the electronic apparatus and the expansion device performs the control on the basis of the information stored in said storing step.

29. A method according to claim 24, further comprising the step of storing information indicative of a state of the electronic apparatus and a state of the expansion device, wherein the control circuit of each of the electronic apparatus and the expansion device performs the control on the basis of the information stored in said storing step.

30. A method according to claim 25, further comprising the step of storing information indicative of a state of the electronic apparatus and a state of the expansion device, wherein the control circuit of each of the electronic apparatus and the expansion device performs the control on the basis of the information stored in said storing step.

31. A method according to claim 26, further comprising the step of storing information indicative of a state of the electronic apparatus and a state of the expansion device, wherein the control circuit of each of the electronic apparatus and the expansion device performs the control on the basis of the information stored in said storing step.

32. A method according to claim 27, further comprising the step of storing information indicative of a state of the electronic apparatus and a state of the expansion device, wherein the control circuit of each of the electronic apparatus and the expansion device performs the control on the basis of the information stored in said storing step.

* * * * *

UNITED STATES PATENT AND TRADEMARK OFFICE
CERTIFICATE OF CORRECTION

PATENT NO. : 5,982,141

DATED : November 9, 1999

INVENTOR(S): MAKOTO HINOHARA

Page 1 of 2

It is certified that error appears in the above-identified patent and that said Letters Patent is hereby corrected as shown below:

COLUMN 1,
Line 11, "and, each have" should read --and--;
Line 12, "and" should read --and each have--;
Line 24, "computer 1'" should read --computer 1',--;
Line 24, "time" should read --time,--;
Line 38, "portability" should read --portability,--;
Line 40, "only" should be deleted;
Line 43, "operability a state of" should read
--operability,--; and
Line 44, "computer, alone" should read --computer alone,--.

COLUMN 5,
Line 40, "the" should be deleted.

UNITED STATES PATENT AND TRADEMARK OFFICE
CERTIFICATE OF CORRECTION

PATENT NO. : 5,982,141

DATED : November 9, 1999

INVENTOR(S): MAKOTO HINOHARA

It is certified that error appears in the above-identified patent and that said Letters Patent is hereby corrected as shown below:

<u>COLUMN 13</u>,
Line 21, "the" (1st occurrence) should be deleted.

Signed and Sealed this

Fourteenth Day of November, 2000

Attest:

Q. TODD DICKINSON

Attesting Officer     Director of Patents and Trademarks